United States Patent
Vanderpol et al.

(10) Patent No.: US 8,955,733 B2
(45) Date of Patent: Feb. 17, 2015

(54) INTERNAL PIPE LINE-UP CLAMPING MODULE

(71) Applicants: Jerald Vanderpol, Shingle Springs, CA (US); Vinh T. Hoang, Elk Grove, CA (US)

(72) Inventors: Jerald Vanderpol, Shingle Springs, CA (US); Vinh T. Hoang, Elk Grove, CA (US)

(73) Assignee: Tri Tool Inc., Rancho Cordova, CA (US)

( * ) Notice: Subject to any disclaimer, the term of this patent is extended or adjusted under 35 U.S.C. 154(b) by 0 days.

(21) Appl. No.: 13/630,379

(22) Filed: Sep. 28, 2012

(65) Prior Publication Data

US 2014/0091128 A1    Apr. 3, 2014

(51) Int. Cl.
*B23K 37/00* (2006.01)
*B23K 37/04* (2006.01)
*B25B 5/14* (2006.01)
*B25B 5/16* (2006.01)
*B25B 5/00* (2006.01)

(52) U.S. Cl.
USPC ......... 228/4.1; 228/44.3; 228/44.5; 228/44.7; 228/47.1; 228/49.1; 228/49.3; 269/143

(58) Field of Classification Search
USPC ............. 228/4.1, 44.3, 44.5, 44.7, 47.1, 49.1, 228/49.3; 269/143
See application file for complete search history.

(56) References Cited

U.S. PATENT DOCUMENTS

| | | | |
|---|---|---|---|
| 2,858,709 A * | 11/1958 | McGurk | 74/519 |
| 3,044,431 A | 5/1960 | Cummings | |
| 3,387,761 A | 6/1968 | Pickard | |
| 3,425,614 A | 2/1969 | Clark | |
| 4,039,115 A | 8/1977 | Randolph et al. | |
| 4,140,262 A | 2/1979 | Wilson et al. | |
| 4,185,811 A * | 1/1980 | Long | 269/6 |
| 4,556,162 A | 12/1985 | Gwin et al. | |
| 5,288,005 A | 2/1994 | Beakley et al. | |
| 5,312,097 A * | 5/1994 | Womack | 269/139 |
| 5,535,938 A | 7/1996 | Leduc | |
| 5,597,108 A | 1/1997 | Dierlam | |
| 6,915,943 B2 | 7/2005 | Laing | |

* cited by examiner

*Primary Examiner* — Erin Saad
(74) *Attorney, Agent, or Firm* — Bacon & Thomas, PLLC (57) ABSTRACT

A clamping module for a pipe line-up system uses bell crank linkages to transmit pipe alignment and clamping forces between radially moving clamping feet and a central axially moving driving head. The clamping feet are arranged in axially spaced sets to internally engage two pipe sections to be welded independently on either side of a weld zone between the pipe sections, with welding shoes in between the clamping feet and spanning the weld zone. The bell crank linkages provide a force multiplier between the driving heads and the clamping feet.

13 Claims, 9 Drawing Sheets

INTERNAL PIPE LINE-UP CLAMPING MODULE

BACKGROUND

A. Field

The invention relates to a clamping module for an internal pipe aligning and clamping apparatus for pipe sections to be welded, commonly referred to as a pipe line-up device.

B. Related Art

Pipe line-up devices and systems are used to internally align and clamp large pipe sections having ends prepared for butt welding so that the pipes are aligned concentrically end-to-end before the start of welding the pipe ends together. Such pipe line-up devices hold the pipe sections in alignment from inside the pipe sections during the welding procedure and then are controlled to release the pipe sections when the weld operation is completed. The welded sections are then moved away from the line-up device and a new prepared pipe section is moved into place for the next weld. Such line-up devices are familiar in continuous pipe laying operations where pipe sections of given length are butt welded end-to-end in a continuous operation to produce a continuous welded pipeline. The line-up devices are configured to operate from inside the pipe sections.

Exemplary known pipe line-up systems of this kind are described in U.S. Pat. No. 3,044,431 to Cummings; U.S. Pat. No. 3,387,761 to Pickard; U.S. Pat. No. 3,425,614 to Clark; U.S. Pat. No. 4,140,262 to Wilson et al.; U.S. Pat. No. 5,288,005 to Beakley et al.; U.S. Pat. No. 5,535,938 to Leduc; U.S. Pat. No. 5,597,108 to Dierlam; and U.S. Pat. No. 6,915,943 to Laing.

In such exemplary systems, a substantially self-contained pipe aligning and clamping system may include an arrangement of a frame, a power supply, piston actuators, a fluid pressure source, and a clamping module that includes two axially spaced sets of radially extendable clamping feet circumferentially spaced around the module, with a set of circumferentially spaced weld shoes between the clamping feet sets. The weld shoes typically are copper or other conductive metal elements that serve as anodes or cathodes for electrical welding operations on the pipe sections, and otherwise support the rear weld area. Other components suited to maneuver the line-up clamping apparatus in the pipe sections being welded may be provided, including a self-propelling drive systems and the like.

In use, the frame and associated apparatus including the clamping module are placed inside the first two pipe sections that have prepared ends to be butt welded together with the prepared ends facing each other end-to-end with the clamping module located so that one set of the clamping feet is located inside one pipe section on one side of the weld area where the pipe ends are to be butt welded together and the other set is located on the other side of the weld area in the other pipe section, and with the weld shoes located internally of and spanning the inner face of the weld area.

The clamping feet are then radially expanded by, typically, fluid or mechanical forces that may be generated by a suitable power source to align the pipe ends concentrically and support the weld area from the inner diameter of the pipe sections, while the weld shoes are extended to engage the rear side of the weld area between the pipe sections. The clamping feet sets may be sequentially extended or refracted in one pipe section and then in the other pipe section, or both may be actuated together. In typical systems, the radial forces driving the clamping feet of the clamping module are generated by fluid pressure acting on pistons or driving heads that axially drive mechanical linkages that convert the driving head axial motion to radial motion of the clamping feet. The clamping feet in turn force the pipe ends into concentric relationship, possibly rounding out any minor pipe eccentricity, and into alignment with the central axis of the aligned pipe sections. Various type welding operations may then be conducted to weld the pipe ends together from the outside of the pipe sections, with the weld shoes contacting the pipe ends during welding, possibly functioning as anodes or cathodes if electrical arc welding is used.

After the first two pipe sections are welded, the clamping feet and weld shoes are refracted, and the entire line-up system with the clamping module is either moved axially to the next weld area or the welded pipe sections are moved longitudinally until the line-up system is located at the next weld area between the free front end of the last pipe section that was welded and the rear end of the next pipe section to be welded. The aligning, clamping and welding process is then repeated to continuously assemble, align and weld pipe sections together to form a continuous pipeline.

In the typical known pipe line-up systems, the mechanical linkage arrangements used in clamping modules to drive the clamping feet radially are able to generate a limited amount of force in reaction to the axial piston or driving head driving forces, and tend to require careful maintenance because of their environment and the high forces involved in their operation. Moreover, the available ratio of axial movement of the piston or driving heads relative to the available degree of radial movement of the clamping feet limits the leverage available between the axially moving driving heads and the radially moving clamping feet, so that the forces generated in the clamping feet may be limited to less than what is desired.

A more robust and powerful clamping module for converting the axial driving head motion into radial clamping feet motion, preferably with force amplification, thus is highly desirable in pipe line-up systems of the type described above.

SUMMARY OF THE DISCLOSURE

The present invention is concerned with achieving a stronger radial clamping force of the clamping feet of a pipe line-up clamping module of the type described above for a given available axial driving head motion and input force.

To this end, an inventive clamping module for an internal pipe line-up clamping system is provided using a bell crank linkage arrangement to convert axial driving head input motion into radial clamping feet output motion with a force amplifying effect in a robust, efficient arrangement.

Further, a unique support system for the bell crank linkage arrangement is provided that enables efficient conversion of axial driving head motion into radial clamping feet motion within the confines of a pipe line-up clamping module.

Still further, an inventive actuator arrangement for controlling synchronized movement of the weld shoes with the movement of the clamping feet is provided for a line-up clamping module embodying the present invention.

BRIEF DESCRIPTION OF THE DRAWINGS

Examples of a pipe line-up clamping apparatus according to different exemplary embodiments of the invention will now be explained in more detail with reference to the drawings, wherein.

In the various figures, similar reference numbers are used for similar elements. It should be noted that the drawing figures are not necessarily drawn to any scale, or proportion, but instead are drawn to provide an understanding of the disclosure. Thus, the illustrations are not intended to be limiting as to the scope of the invention described herein, but rather to provide exemplary illustrations thereof.

DETAILED DESCRIPTION OF ILLUSTRATIVE EMBODIMENTS OF THE INVENTION

Figure 1:
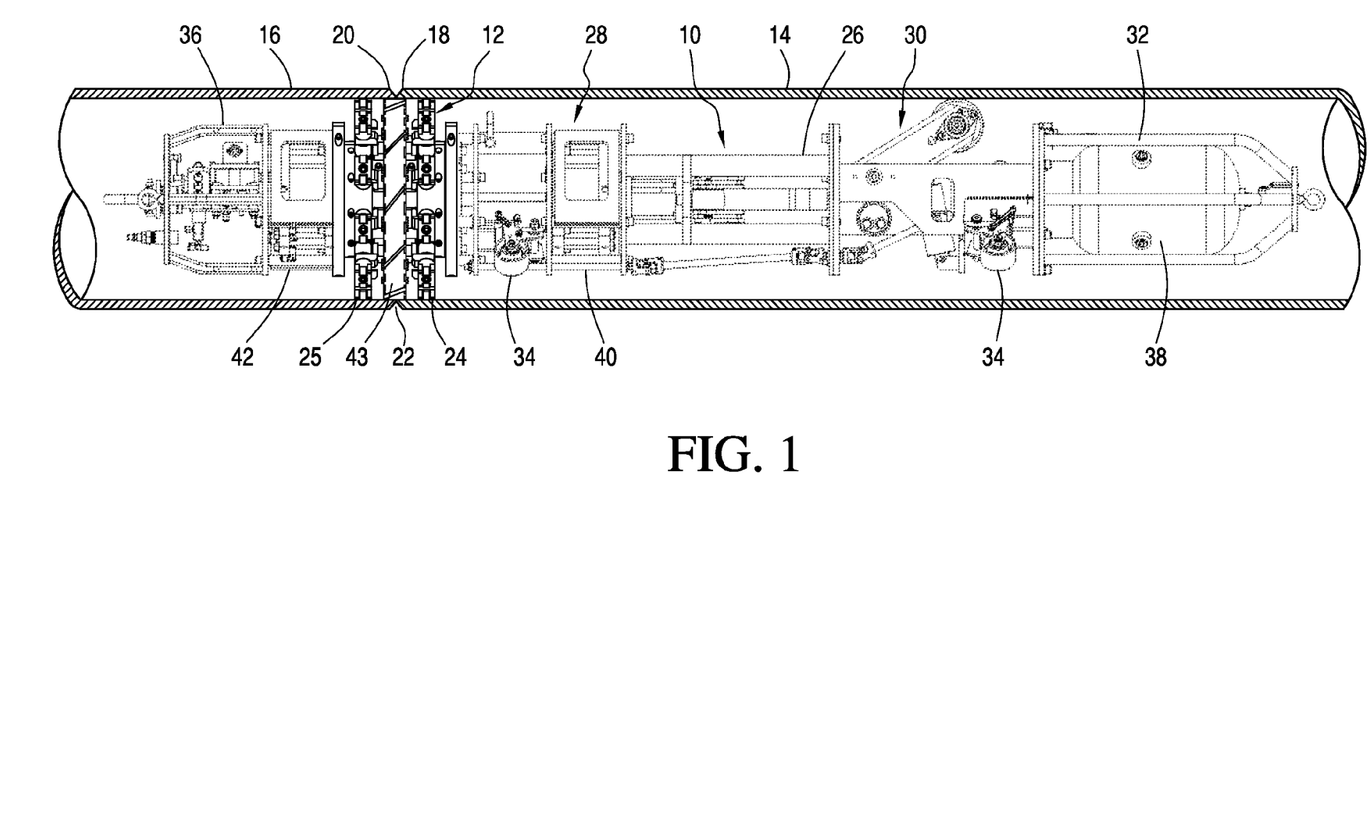
FIG. 1 is a partial sectional, side elevation view of a pipe line-up clamping system for internally aligning and clamping two pipe sections end-to-end in preparation for butt welding the pipe sections together in accordance with the present invention.

With reference to FIG. 1 of the drawings, a typical layout of an internal pipe line-up clamping system 10 is shown to illustrate the environment of the clamping module 12 embodying the present invention.

The internal pipe line-up clamping system 10 is arranged to internally clamp and align pipe sections 14, 16 together during the butt welding of previously prepared pipe end sections 18, 20 along a weld area 22 in a continuous pipeline production process. The clamping module 12 contains two sets of circumferentially spaced, radially extendible clamping feet 24, 25 that are extended under power to engage the inner sides of the pipe end sections 18, 20 to align them concentrically and to round out minor eccentricities. In this embodiment, the pipe end weld preparation illustrated is a simple bevel end prep.

Other components of the line-up system include a rear frame 26 that extends axially between a forward guide assembly 28, a rear guide assembly 30 and rear end frame 32 and that are all configured to be movable internally within the pipe sections 14, 16.

The forward and rear guide assemblies 28, 30 contain appropriate wheels or guides 34 for supporting the line-up clamping system 10 in the rearward pipe section 14, in this example, and drive wheels may also be used to propel the clamping system in the pipe sections if desired. The clamping module 12 is located forward of the forward guide assembly 28 and is connected to the forward guide assembly 28 on one side of the clamping module. A front end frame 36 is provided towards the forward end of the clamping system 10 and is connected to the forward end of the clamping module 12.

A fluid pressure supply vessel 38 is supported in the rear frame 26 and fluid pressure driven pistons (not shown) within piston modules 40, 42 are connected to the vessel 38 by appropriate hoses or connections (not shown). Fluid pressure is supplied to the vessel 38 by any appropriate means, either self-contained or from externally of the clamping system 10. The piston modules 40, 42 contain axially reciprocating pistons (not shown) that are driven by fluid pressure, usually compressed air, received from the fluid pressure supply vessel 38 under the control of a control system (not shown) that coordinates the actuation of the pistons with the welding operation and the actuation of the clamping feet 24, 25 and welding shoes assemblies 43 during the pipe alignment and clamping operations. The clamping module 12 is connected to piston rods or shafts (not shown) connected to the pistons of piston modules 40, 42 on either side of the clamping module 12 that actuate axially movable driving heads (to be described below) in opposed sides of the module 12 that in turn are connected to bell crank linkages (to be described below) that convert the axial movement of the driving heads into radial clamping and unclamping movement of the clamping feet sets 24, 25 of the clamping module 12.

In the example illustrated in FIG. 1, the pipe sections 14, 16 move to the right (or rearward in this example) after being welded together to form a continuous pipeline that extends rearward of the line-up clamping system 10 until the opposite free end of the just welded front pipe section 16 is located at the welding station where the welding is to occur, with the clamping module 12 again located in the manner shown in FIG. 1. The process then is repeated for aligning and clamping the pipe end sections 14, 16 during the next welding operation at the weld area 22.

Figure 2:
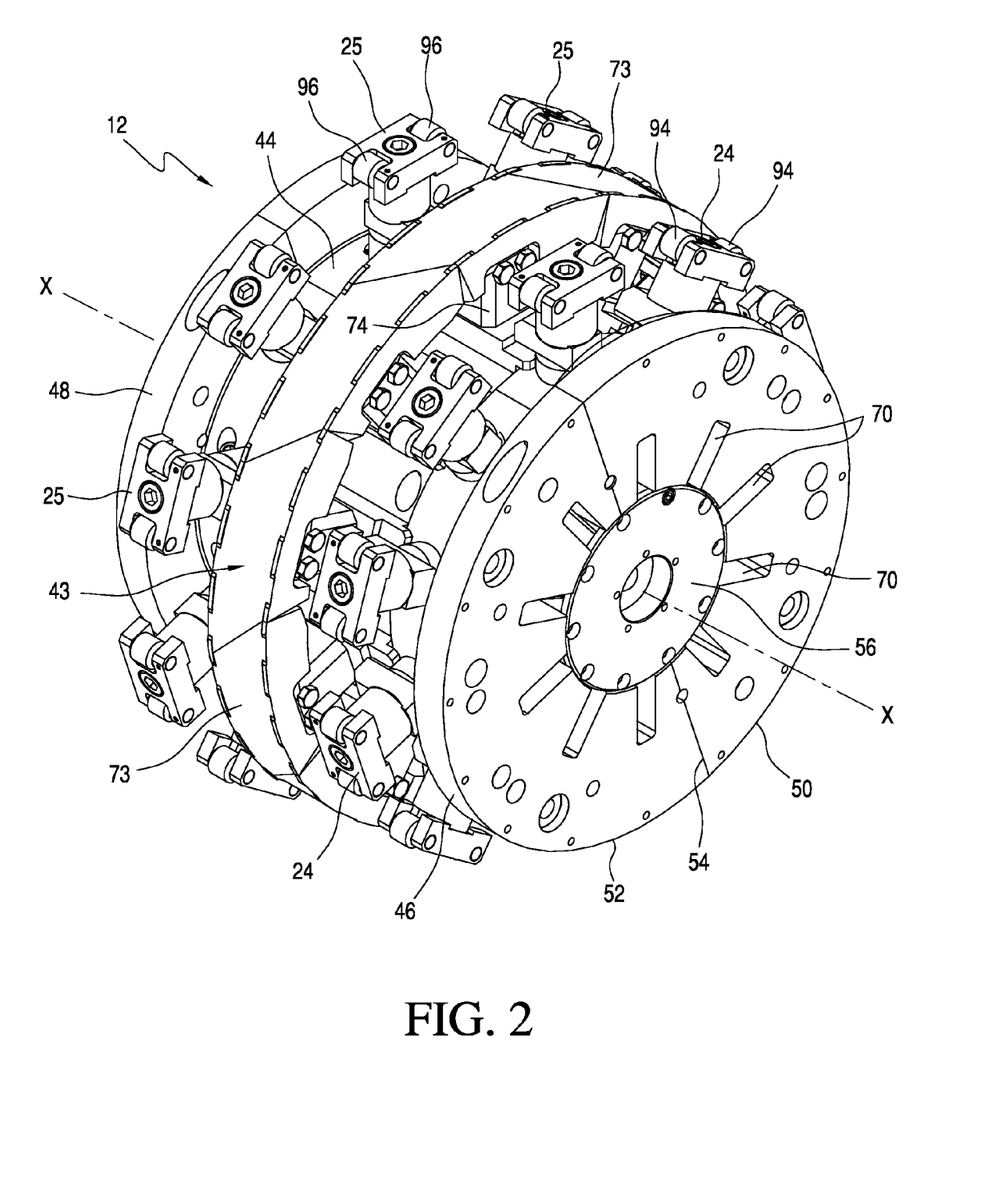
FIG. 2 is an isometric view of a clamping module according to the present invention used in the pipe line-up system of FIG. 1, showing one set of clamping feet retracted and a second set extended.
Figure 3:
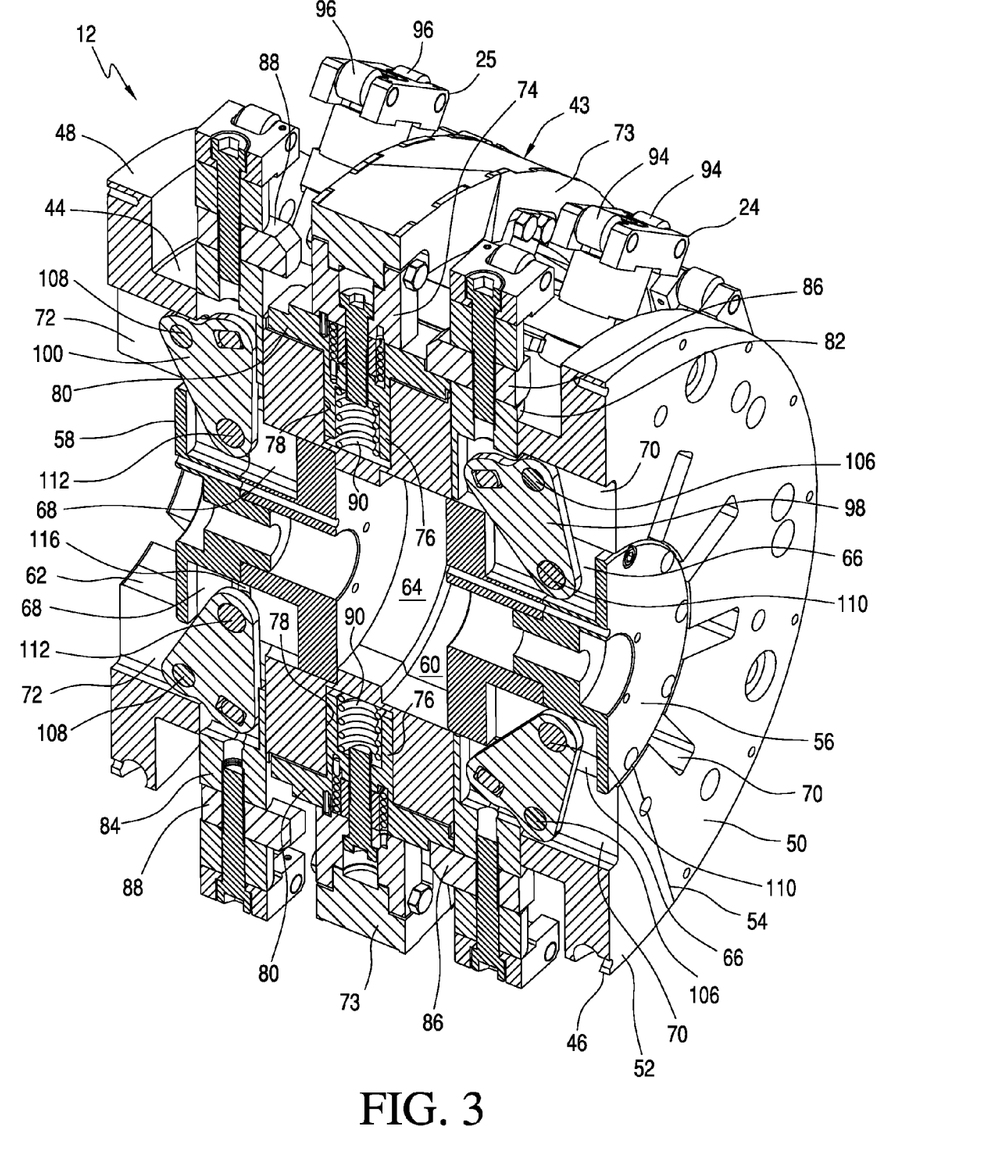
FIG. 3 is a cross-sectional view of the clamping module of FIG. 2, showing one set of clamping feet and their associated weld shoes in the extended position and the other set of weld shoes in the retracted position, including the details of the module driving heads and the bell crank linkages used to transmit input driving head motion to the clamping feet, including their fixed pivots or fulcrums, their input driving connections with the driving heads and their output driven connections with the clamping feet.

The external details of the clamping module 12 embodying an example of the present invention is shown isolated in FIG. 2, while FIG. 3 shows the internal details of the module in a central, vertical cross sectional view thereof.

The clamping module 12 is formed as a split annular body element having a longitudinal axis X-X and formed with an axially or longitudinally extending central body 44 flanked on either end with flanges 46, 48 at the front and rear ends of the central body 44. The flanges facilitate connecting the module 12 to the front and rear piston modules 40, 42, for example.

The module 12 preferably is formed of two halves 50, 52, preferably formed of a light weight, high strength metal such as aluminum alloy, joined along mating, radially extending surfaces 53, 53a (see FIG. 4) intersecting along a dividing line or plane 54 that intersects the longitudinal axis X-X of the module central body 44.

Annular driving heads 56, 58 are disposed for axial reciprocating movement in central bores 60, 62 in the central body 44, and a driving head stop projection 64 separates the bores 60, 62 while providing a motion limiting stop axially inwardly for the driving heads 56, 58. The driving heads 56, 58 have radially and axially extending driving head slots 66, 68 that are aligned with central body axially and radially extending slot sets 70, 72 that intersect the flanged ends of the central body 44 and the central body 44 as well. The driving heads 56, 58 are configured to be connected to a respective piston connecting rod or shaft (not shown) that is longitudinally moved by a piston in each piston module 40, 42 that drives each driving head when the respective piston is actuated by fluid pressure under the direction of a control system for the clamping system 10. In FIGS. 2 and 3, the rear driving head 56 is shown in a first retracted position closer to the flange 46 than the stop projection 64, while the front driving head 58 is shown in a second extended position against the stop projection 64 away from the flange 48. The driving heads thus are axially moveable between these extreme positions by the pistons in piston modules 40, 42 when the piston modules are controlled by a controller to extend and retract the clamping feet 24, 25 in a manner to be described below.

The central body 44 also supports welding shoe assemblies 43 that comprise individual conductive outer welding shoes 73 assembled end-to-end around the central body 44 on welding shoe supports 74 connected to welding shoe pistons 76 that are radially moveable between extended and retracted positions within radial welding shoe piston bores 78 spaced circumferentially around the module central body 44. The welding shoe pistons 76 are connected to piston heads or flanges 80 that extend laterally of the bores 78 in rearward and forward longitudinal directions and move radially with the pistons 76.

Rear and front sets of clamping feet 24, 25 are supported on the clamping module central body 44 for radial reciprocating movement by clamping feet piston sets 82, 84, respectively. Intermediate the clamping feet 24, 25 and their respective clamping feet piston, welding shoe pull-down blocks 86, 88 are provided that are connected with the pistons for radial reciprocating movement therewith. The pull-down blocks 86, 88 extend longitudinally for a sufficient distance to individually engage welding shoe piston heads 80 on either side thereof so that the position of the welding shoe pistons 76 and their respective welding shoes is determined by the radial positions of the pulldown blocks on either side of the welding shoe piston heads 80.

The welding shoe pistons 76 are normally radially biased outwardly toward their extended position by compression springs 90 located under the welding shoe pistons 76 at the bottom of blind bores 78 (see FIG. 4) in which the welding shoe pistons 76 are located for reciprocal movement. The pistons 76 are driven radially inwardly against the forces of the compression springs 90 by the pull-down blocks 86,88 when the clamping feet piston sets 82,84 are moved to their retracted position closer to the central axis X-X of the central body 44.

In FIG. 3, the rear set of clamping feet pistons 82 are shown retracted and the pull-down block sets 86 have pulled the adjacent piston heads 80 to their retracted positions along with their respective welding shoes 73. The front set of clamping feet pistons 84, on the other hand, are shown radially extended so that their respective welding shoe pull-down blocks 88 are in radially extended positions away from contact with the adjacent welding shoe piston heads 80. It will be observed that either the front or rear sets of pull-down blocks 86, 88 or both of them simultaneously can be actuated to pull the welding shoes inwardly to their retracted positions, but both sets of pull-down blocks 86, 88 must be in their extended positions to permit the welding shoes 73 to be extended radially. The welding shoes in their extended positions will be biased against the inner sides of the pipe sections 18, 20 opposite the weld area 22 by the compression springs 90 to function in accordance with their intended purpose, e.g., as anodes or cathodes for the electric arc welding procedure used to weld the pipe end sections 18, 20, or for other purposes as is well known in the art.

Figure 9:
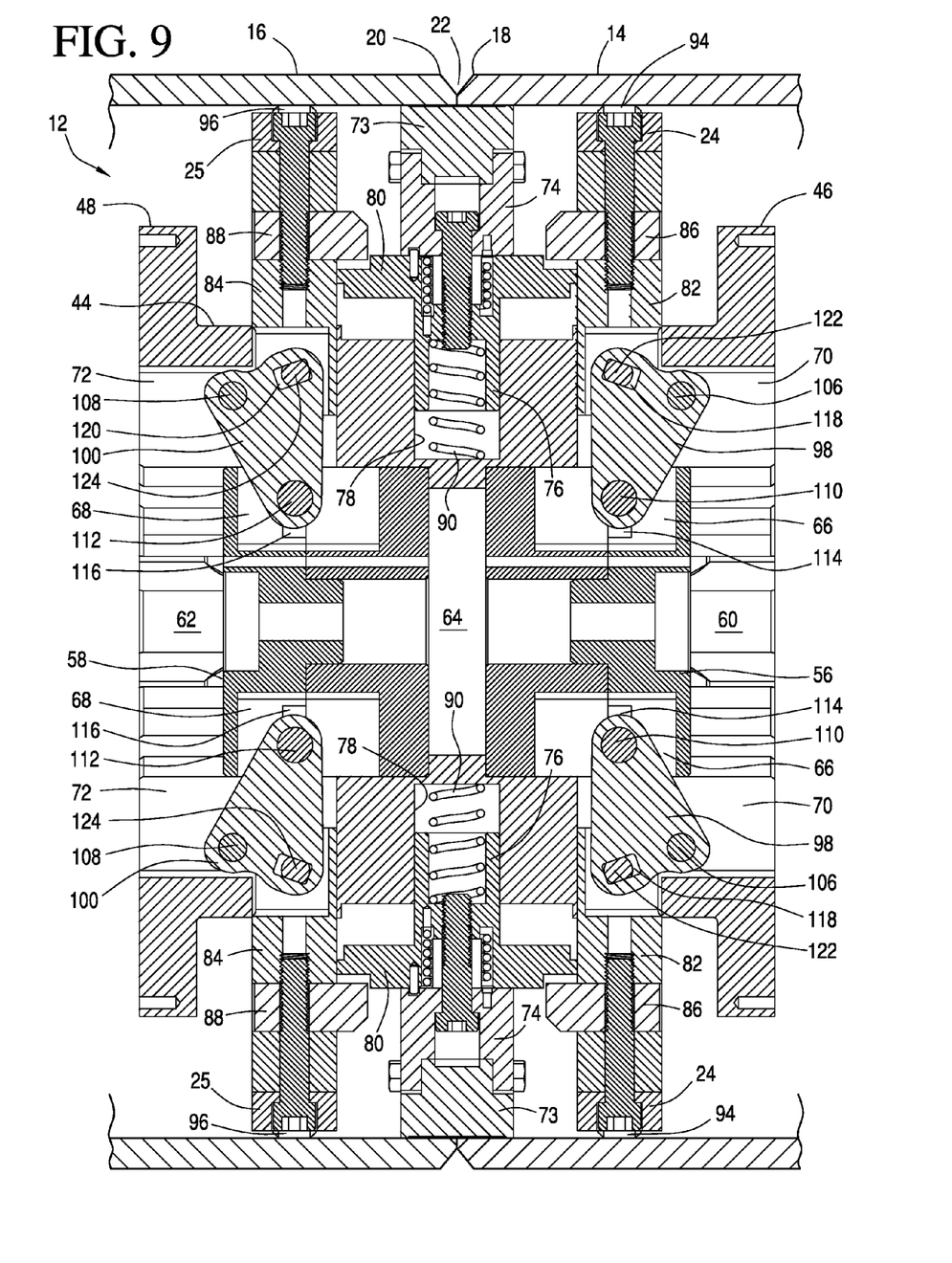
FIG. 9 is cross-sectional view of the clamping module of FIG. 2 showing the welding shoes and both sets of clamping feet located in their radially extended positions, with the clamping feet engaging the interior of two pipe sections to align the sections and hold them in alignment in preparation for butt welding the pipe sections.

The clamping feet 24, 25 typically are provided with pipe engaging contact elements or surfaces 94, 96 that, when extended, frictionally contact the interior walls of the pipe end sections 14, 16 adjacent and on either side of the weld area 22 to align the pipe end sections and to clamp them up in aligned relationship during the welding procedure (see FIG. 9). The clamping feet preferably are self-centering elements, such as rollers mounted on pivotal supports, as shown.

Figure 4:
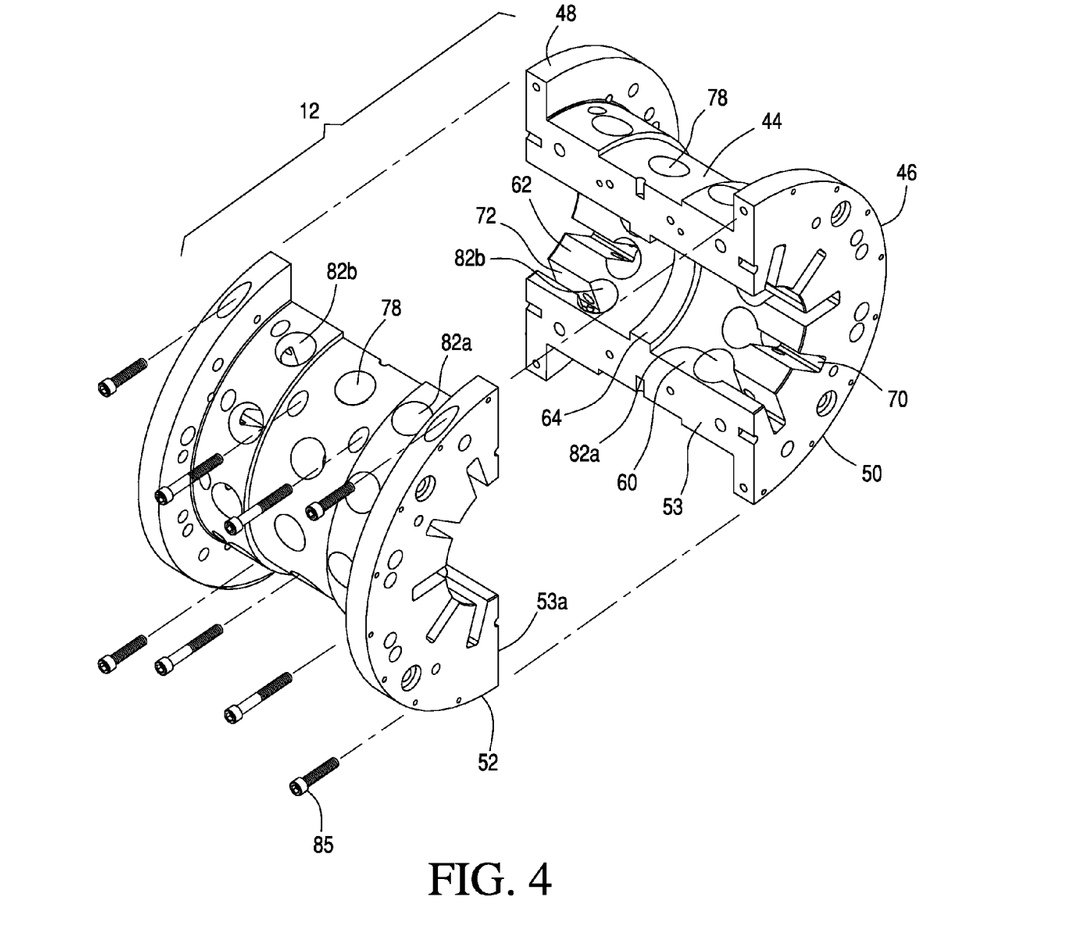
FIG. 4 is an exploded detail view of an embodiment of a central body of the clamping module of FIG. 2.

As seen in FIG. 4, radial clamping feet piston bores 82*a*, 82*b* that intersect the radial slots 70, 72 of the clamping module central body 44 are provided for receiving the clamping piston sets 82, 84. The clamping module body halves 50, 52 may be secured together by appropriate fasteners 85. The blind welding shoe piston bores 78 are also shown in FIG. 4 extending radially through the central body 44 of the clamping module 12 between the axially and circumferentially spaced clamping feet piston bore sets 82*a*, 82*b*.

For controlling the positions of the clamping feet 24, 25, their respective clamping feet piston sets 82, 84 are connected to rear and front bell crank linkage sets 98, 100 that include bell crank bodies that are connected for pivotal movement about pivot pin sets 106, 108 (also referred to as fulcrum pins) connecting the bell crank bodies to the central body 44 of the clamping module 12.

Figure 6:
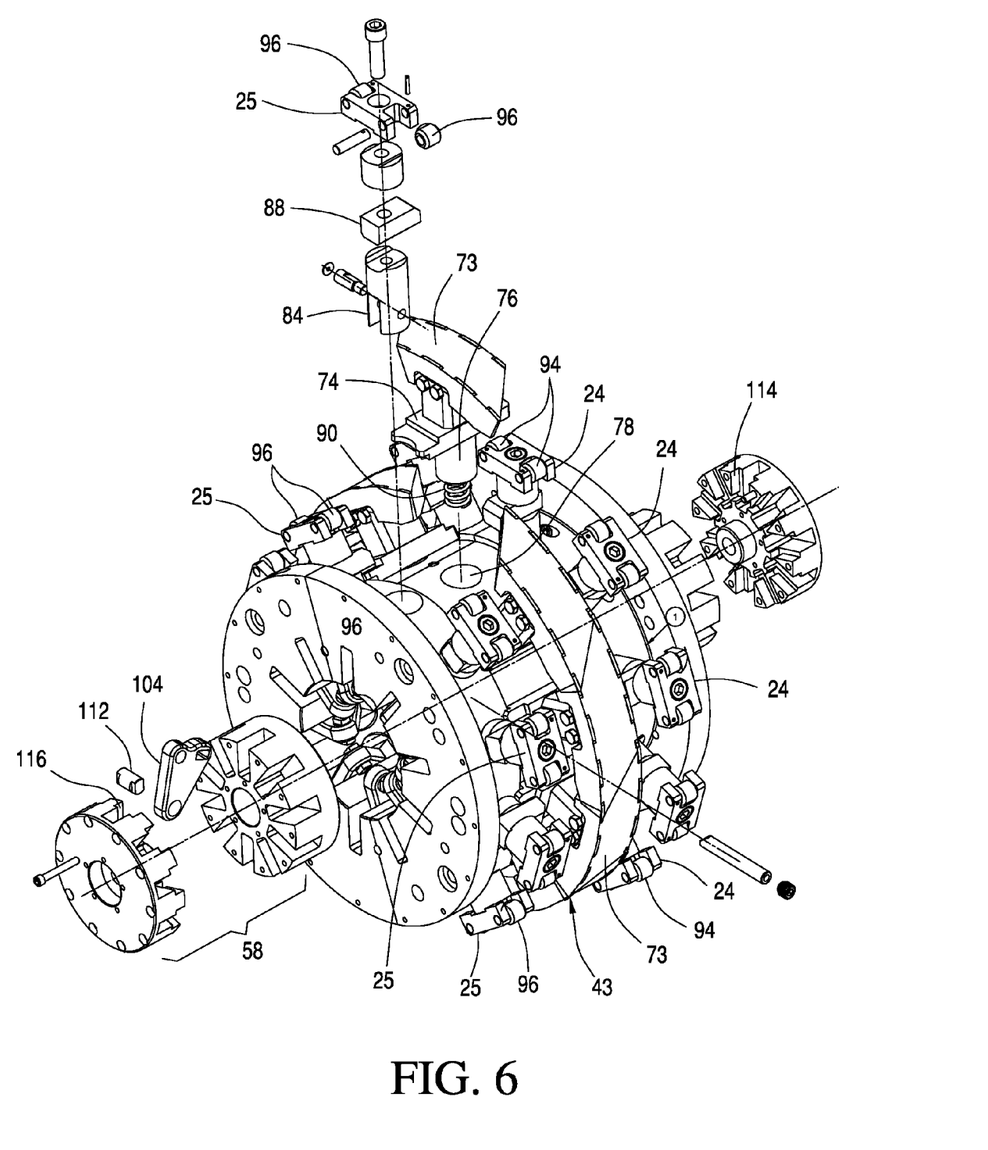
FIG. 6 is a partial exploded external view of the clamping module of FIG. 2 showing details of the driving heads, clamping feet, the welding shoes and the central body.
Figure 8A:
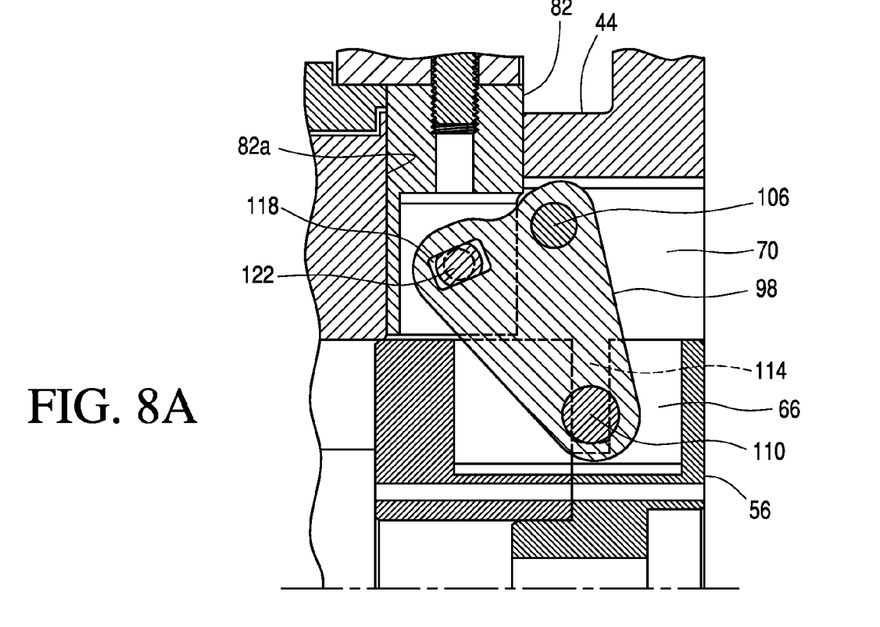
FIG. 8A is a detail view showing a single bell crank linkage with its associated driving piston head, the bell crank body, its pivot or fulcrum pin, its input driving pin and sliding connection, its output driven pin and sliding connection, and a clamping foot connected to the output driven pin, with the clamping foot located in the retracted position.
Figure 8B:
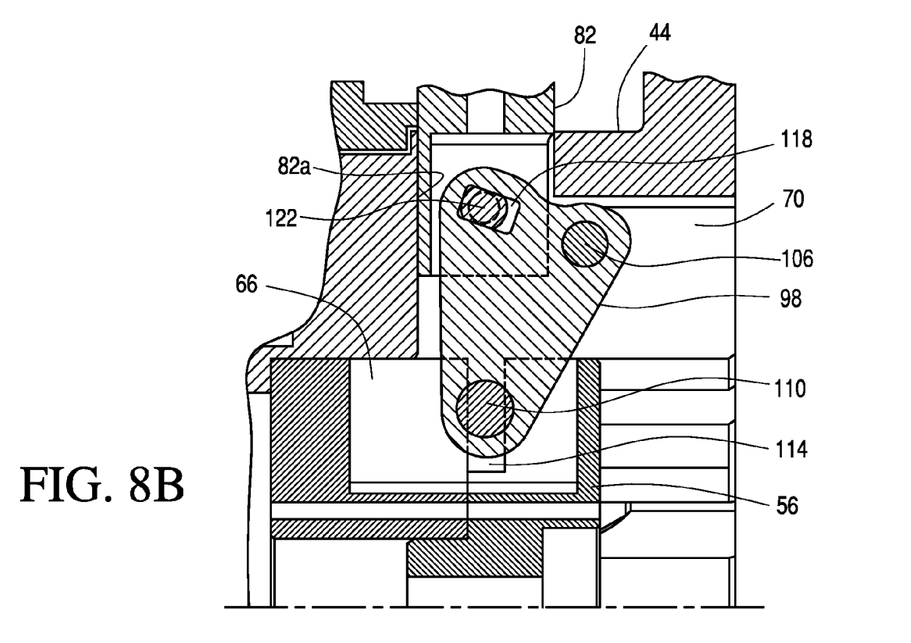
FIG. 8B is a detail view corresponding to FIG. 8A but showing the bell crank linkage and the clamping foot in the extending clamping position.

The bell crank linkages of each linkage set 98, 100 are also connected to the driving heads 56, 58 by input drive pin sets 110, 112 that extend chordwise of the driving heads and that slide within radial input drive slots 114, 116 as best viewed in FIGS. 6, 8*a* and 8*b*. The exemplary driving heads 56, 58 are formed as two piece assemblies as shown in FIG. 6 to enable assembly of the drive pins 110, 112 with the driving heads and respective bell crank bodies. The input drive pin sets 110, 112 are connected to respective bell crank bodies and transmit axial input driving movement of the driving heads 56, 58 to the bell crank bodies of each crank pin linkage set 98, 100 causing them to rotate about their respective fulcrum pivot pins 106, 108 within their respective driving head and central body radial slots 66, 68, 70, 72. The arrangement of the input drive pins of the pin sets 110, 112 in radially extending drive slots in the driving heads 56, 58 provides a lost motion connection between the input drive pin sets 110, 112 and the bell crank linkage sets 98, 100 necessitated by the relative rotational motion between the bell crank bodies and the driving heads 56, 58. The sliding connection between the input pin sets 110, 112 and the driving heads thus accommodates the relative rotational movement of the bell crank bodies without mechanical interference. Thus, the movement of the driving heads 56, 58 determines the position of each bell crank linkage of the linkage sets 98, 100 and provides input driving movement to the respective bell crank linkages via the input drive pin sets 110, 112.

The bell crank bodies of each bell crank linkage set 98, 100 are provided with output driven slots 118, 120 (see FIG. 5) that accommodate driven pin sets 122, 124 connected to respective clamping feet pistons of clamping feet piston sets 82, 84 in sliding relationship within the slots 118, 120, to thereby provide a lost motion connection between the driven slots 118, 120 and the driven pins of the driven pin sets 122, 124 that accommodates the relative rotation between the crank bodies of the bell crank linkage sets 98, 100 and the driven pins of the driven pin sets 122, 124.

The crank pin linkages by their arrangement thus convert the axial movement of the driving heads 56, 58 to radial movement of the clamping feet 24, 25 by transmitting essentially axial input drive movement at their input drive pin sets 110, 112 in a radial direction to the clamping feet piston sets 82, 84 via the bell crank bodies of the bell crank linkage sets 98, 100 that are rotated about their respective fixed fulcrum pins 106, 108 to move output driven pin slot sets 118, 120 in rotation to move driven pin sets 122, 124 and the clamping feet piston sets 82, 84 with clamping feet 24, 25 radially between extended and retracted positions.

The bell crank bodies of each bell crank linkage set 98, 100 are each constructed of solid metal that extends between all the fulcrum pin sets 106, 108, input drive pin sets 110, 112 and driven slot sets 118, 120 of the bell crank linkages.

Figure 5:
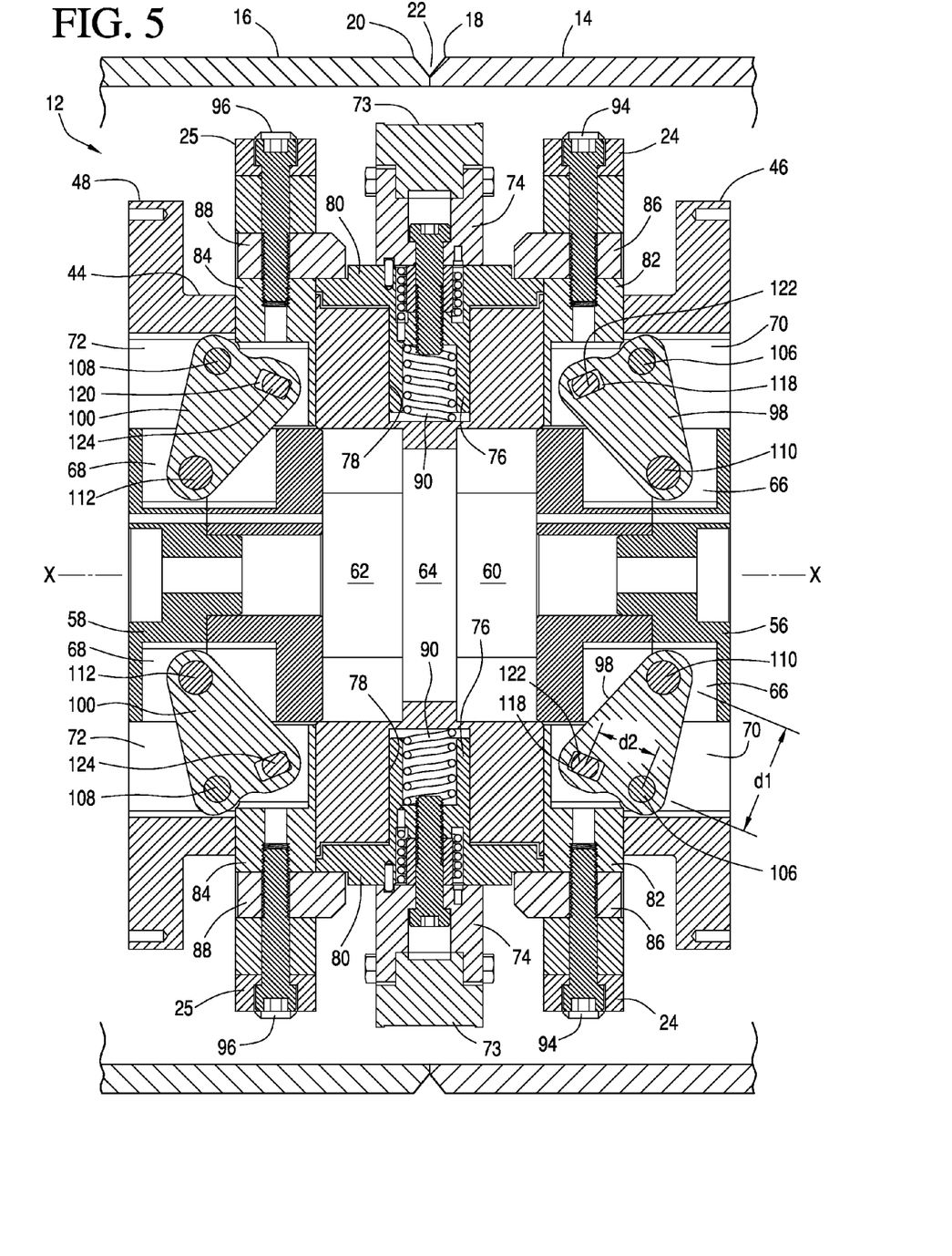
FIG. 5 is a cross-sectional view of the clamping module of FIG. 2, showing the driving heads, clamping feet, and welding shoes in the retracted positions.

To provide a mechanical amplification of input driving force from driving heads 56, 58 applied to the clamping feet pistons sets 82, 84, the geometry of the bell crank linkage sets 98, 100 is arranged so that the moment arm between the fulcrum pin sets 106, 108 and the input drive pin sets 110, 112 has length d1 as seen in FIG. 5 which is longer than the moment arm between the driven pin sets 122, 124 and the fulcrum pin sets 106, 108 which is of length d2 as seen in FIG. 5. The amplification of input force from input drive pin sets 110, 112 as applied to the driven pin sets 122, 124 thus will be the ratio of d1/d2 in this example.

The geometry of the bell crank linkage sets 98,100 and the output driven slots and the respective driven pin sets ensures that the output driven forces imparted by the linkages to the clamping feet piston sets 82, 84 will be applied substantially in radial directions and will be substantially linear in such radial directions. Thus, the forces applied by the driving heads 56, 58 to the bell crank linkages via the input drive pin sets 110, 112 is imparted via the solid metal bell crank linkage bodies of the body sets 98, 100 to the clamping feet sets 24, 25 to move them directly radially with a force amplification in an efficient, low friction manner utilizing few mechanical elements. The arrangement of the fulcrum pins 106, 108, the input drive pin sets 110, 112 and the output driven slots 118, 120 and driven pins 122, 124 obtains such result in a very compact, rugged arrangement.

In operation, with the clamping module 12 installed as shown in FIG. 1 at the weld area 22 where two pipe sections 16, 18 are to be butt welded, the driving heads 56, 58 are first in their retracted positions as shown in FIG. 5. The rear driving head 56 typically will first be actuated by the fluid pistons of the line-up system 10 to extend the rear clamping feet set 24 within the rear pipe end section 18 until the front pipe section 20 is brought up to the first pipe end section 18 in approximate position for welding. The front set of clamping feet 25 are then extended by the front driving head 58 to cause the front set of clamping feet 25 with the rear set of clamping feet 24 to align the pipe ends 18, 20 and to clamp them in an aligned position in preparation for welding. The clamping module 12, of course, has already been secured in concentric aligned position within the rear pipe section 14 so that when the clamping feet sets 24, 25 are fully extended by the driving heads 56,58 the two end sections 18, 20 are concentrically aligned as shown in FIG. 1.

The bell crank linkage sets 98 100 provide a robust, powerful multiplication of the input forces of the driving heads 56,58 to enable a higher force to be applied to the clamping feet sets 24, 25 as compared with prior art clamping feet driving systems, all within a compact clamping module configuration.

Figure 7:
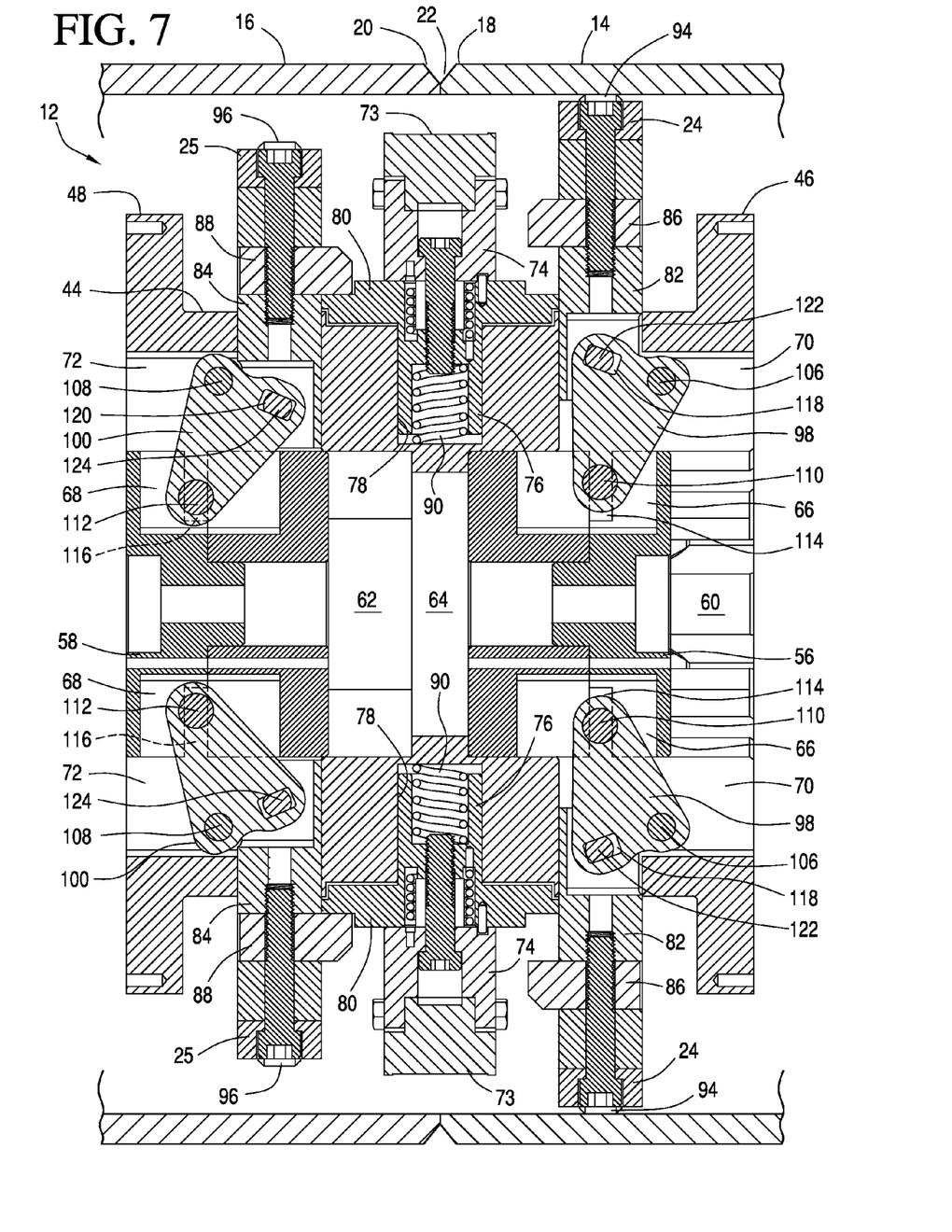
FIG. 7 is a cross-sectional view of the clamping module of FIG. 2 showing one set of clamping feet in the extended position within one pipe section and the other set of clamping feet in the other pipe section in the retracted position, with details of the driving heads, welding shoes and bell crank linkages.

The welding shoes 73 will be extended and retracted with the clamping feet sets 24, 25 in a coordinated manner so that when both clamping feet sets 24, 25 are extended to their clamping positions as shown in FIG. 9, the welding shoes 43 will be located in back of the weld area. The welding shoes are retracted when either set of clamping feet 24, 25 are retracted by the action of the pull-down blocks 86, 88, as shown in FIG. 7, for example.

Upon completion of a welding operation at the weld area, the clamping feet sets 24, 25 are retracted by the actuation of the driving heads towards a retracted position, the two welded pipe sections are moved rearward while the pipe line-up system is held in place until the previous front end of the front pipe section 20 is located between the clamping feet sets 24, 25 as shown in FIG. 5, for example, whereupon the rear set of clamping feet are actuated to clamp the module 12 inside the former front pipe section 20, which now becomes the new rear pipe section. A new front pipe section is then brought up into approximate alignment with the rear pipe end section and the procedure is repeated. Other operating steps may be implemented during the various procedures and operations described above.

While a single exemplary embodiment of a clamping module embodying the present invention has been described, the module could be made in various other forms without departing from the novel concepts underlying the invention. The arrangement of split central body 44 and the multi-part assembly of the driving head, for example, with the associated driving head and central body slots could be different, and the particular form of the bell crank linkage sets 98, 100 could be varied to accommodate specific geometry of supporting structures of the clamping module. The supporting structures for the clamping feet sets and the welding shoes likewise could be varied without changing the essential operation of the clamping module, provided that the concept of the bell crank linkages are used to actuate the clamping feet between extended and retracted positions. While the bell crank linkages are described as being used to both extend and retract the clamping feet, it is the extension of the clamping feet to their clamping positions that benefits the most from the motion and/or force advantage of the bell crank linkages, so that conceivably other means such as spring devices could be used to retract the clamping feet from their extended clamping positions.

The inventive concept of using the bell crank linkages to drive the clamping feet could be embodied in a simpler module assembly as well, for example where one or more driving heads are associated with a module body having a central or longitudinal axis for axial movement relative to the module body, a plurality of clamping feet are mounted on the module body for relative transverse movement relative to the body between extended and retracted positions, and the bell crank linkages according to the present invention are used in the manner described above to connect the driving head or heads to the clamping feet, resulting in conversion of the axial movement of the driving head or heads to radial movement of the clamping feet, preferably with amplification of the driving force applied to the clamping feet by the use of bell crank linkages having a geometry between a fulcrum, driving input connection and driven output connection that provides an amplification of input driving force applied to the output driven connection. Such a geometry, for example, could be in the form of a bell crank linkage having a longer moment arm between its fulcrum and its driving connection than the moment arm between its fulcrum and its driven connection, as described herein.

Fluid pistons associated with the pipe line-up clamping system 10 are described herein as examples of mechanisms that can provide actuating force for the driving heads 56, 58, but it will be understood that other motivating devices could be used as well in such a clamping system using the clamping module 12, provided they are adapted to be connected operationally with the driving heads 56, 58.

The control system for the pipe line-up clamping system 10 is conventional and does not form a specific part of the present invention. Such control systems are configured to enable coordination and automation of the operation of the clamping system and in particular the operations of the clamping feet sets and weld shoes of the clamping module 12, along with movement of the pipe sections relative to the line-up clamping system 10.

Accordingly, the above description of an exemplary form or embodiment of a clamping module for a pipe line-up clamping system is not intended to limit the scope of the present invention in any manner beyond the full scope of the appended claims.

What is claimed:

1. A clamping module comprising:
    an annular central module body having a central axis, axially extending driving head receiving openings located at each end of the module body and a pair of radially extending bore sets, each bore set comprising circumferentially spaced, radially extending bores, and said bore sets being axially spaced along the axis of the module body;
    a pair of driving heads disposed in the central driving head receiving openings in a manner enabling axial reciprocal movement therein;
    clamping feet devices disposed in the bores of each bore set for reciprocal movement therein; and
    bell crank linkages connected to the module body, the driving heads and to the clamping feet devices by fulcrum pins, driving connections and driven connections, respectively, such that axial reciprocal movement of the driving heads causes the bell crank linkages to pivot about their respective fulcrum pins by the driving connections and to convert the axial movement of the driving connections to radial movement of the clamping feet devices in their respective bores by the driven connections.

2. The clamping module according to claim 1, wherein the bell crank linkages are configured to apply a multiplication of the driving force applied the each linkage by its respective driving connection to its respective driven connection to thereby amplify a driving force applied to the clamping feet devices.

3. The clamping module according to claim 1 wherein the bell crank linkages comprise solid metal in each direction between the fulcrum pins, the driving connections and the driven connections.

4. The clamping module according to claim 1, including a third set of circumferentially spaced, radially extending bores in the central body located between said pair of radially extending bore sets, and welding shoe devices disposed in said third set of bores for radial reciprocal movement therein;
    compression springs associated with the welding shoe devices arranged to normally bias the welding shoe devices radially outwardly of the central body; and
    welding shoe pull down blocks associated with the clamping feet arranged to engage the welding shoe devices and to cause their retraction towards the central body axis when the clamping feet devices are retracted towards the axis.

5. The clamping module according to claim 1, said central body formed of two halves divided longitudinally of the central body along a plane including the longitudinal axis;
    a portion of said driving head receiving openings, bore hole sets, and clamping feet devices being disposed in each half.

6. The clamping module according to claim 4, said clamping feet devices comprising pipe section engaging distal end elements and being supported by clamping feet pistons disposed in said axially spaced sets of radial bores for reciprocal movement therein, said pull down blocks connected to said clamping feet pistons for reciprocal movement therewith.

7. The clamping module according to claim 6, said welding shoe devices being connected to welding shoe support pistons disposed in said third set of bores, each of said pistons including a piston head extending transversally axially of its respective bore sufficiently to be separately engagable by respective adjacent pull down blocks on either side of the bore.

8. The clamping module according to claim 7, said compression springs each being disposed in a respective bore of said third set of bores beneath a respective piston in said bore to normally bias each piston radially outwardly of each bore.

9. The clamping module according to claim 3, wherein said driving connections and said driven connections provide a lost motion connection between the driving heads and the clamping feet devices.

10. The clamping module according to claim 3, wherein the central body comprises axially and radially extending slots space circumferentially around and extending radially from each driving head receiving opening, with a respective one of said bell crank linkages being disposed in each of said slots.

11. The clamping module according to claim 10, wherein said bell crank linkages span the central body and the driving heads.

12. The clamping module according to claim 1, including a driving head stop abutment disposed centrally of central body adjacent said driving head receiving opening and configured to limit the axial movement of each driving head within the central body.

13. An internal pipe line-up system for aligning and clamping ends of pipe sections to be butt welded together from within the pipe sections, comprising the clamping module recited in claim 1.

* * * * *